Jan. 17, 1956  N. D. DAUGUSTA  2,730,918
TOOL POST AND TOOL HOLDER
Filed April 4, 1951  2 Sheets-Sheet 1
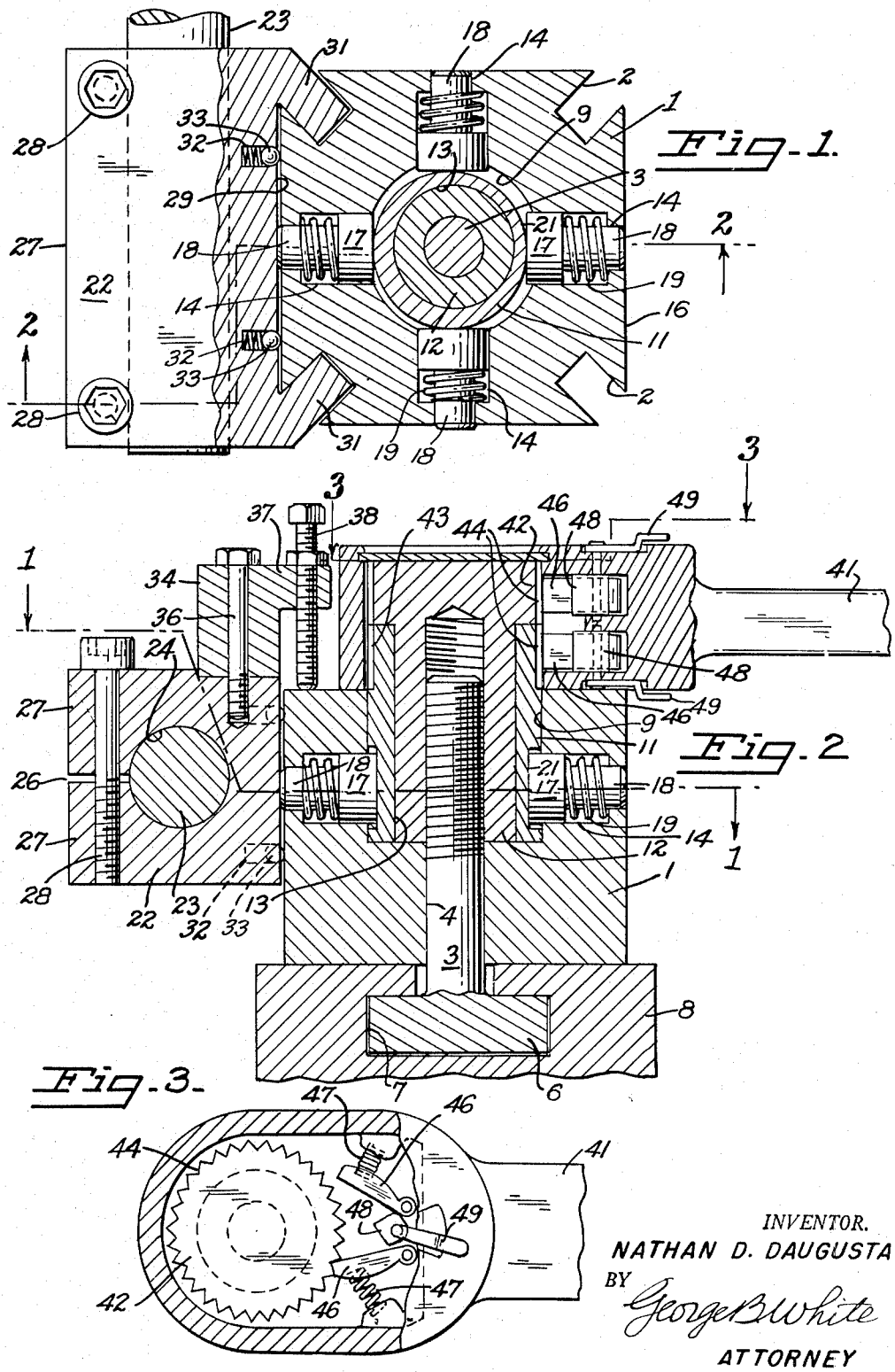
INVENTOR.
NATHAN D. DAUGUSTA
BY
*George B White*
ATTORNEY

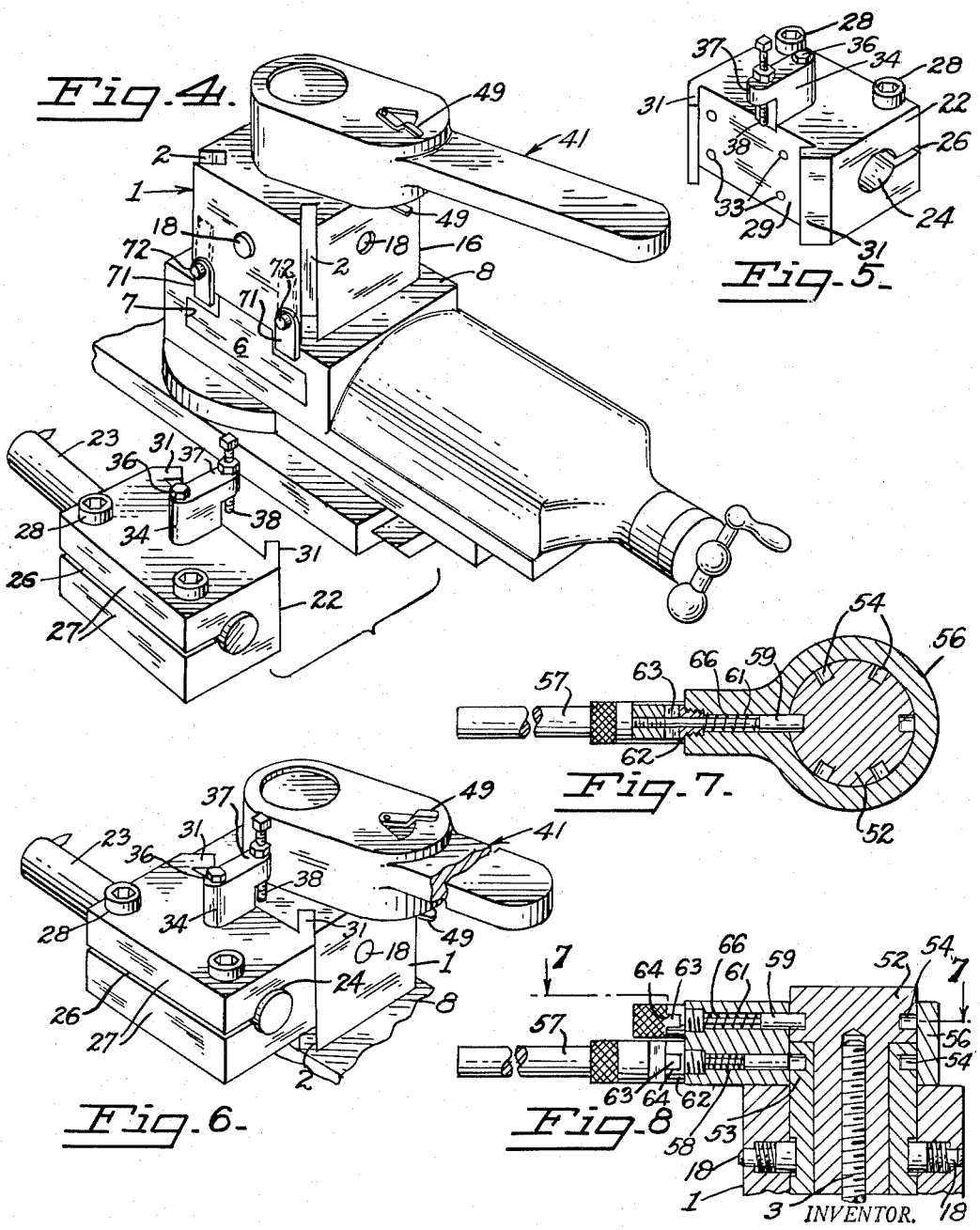

United States Patent Office 2,730,918
Patented Jan. 17, 1956

2,730,918

TOOL POST AND TOOL HOLDER

Nathan D. Daugusta, San Francisco, Calif.

Application April 4, 1951, Serial No. 219,234

5 Claims. (Cl. 82—36)

This invention relates to a tool post and tool holder for lathes or similar machines.

The primary object of this invention is to provide a tool post which can be set at any desired angle on a lathe or the like, and a tool holder which can be quickly attached to the tool post and adjusted to set up the tool at suitable center for a desired machine operation.

The advantages of my invention include: acceleration of production by rapid changing of tools for any desired sequence of operations; speedy mounting on any standard type lathe or similar machine, quick and easy loosening adjusting and tightening of tool post at a desired angle about its mounting bolt; quick and easy fastening and loosening of the tool holder on the tool post for changing tools; manipulation both for attaching the tool post to a lathe and for fastening a tool holder thereon through a single handle acting selectively on the manipulating heads of mounting elements and of eccentric tightening cam; the true and positive alignment of the tool holder against a face of the tool post; the positive pressure engagement of the tool holder with the adjacent side and corners of the tool post.

I am aware that some changes may be made in the general arrangements and combinations of the several devices and parts, as well as in the details of the construction thereof without departing from the scope of the present invention as set forth in the following specification and as defined in the following claims; hence I do not limit my invention to the exact arrangements and combinations of the said device and parts as described in the said specification nor do I confine myself to the exact details of the construction of the said parts as illustrated in the accompanying drawings.

With the foregoing and other objects in view, which will be made manifest in the following detailed description reference is had to the accompanying drawings for the illustrative embodiment of the invention, wherein:

Fig. 1 is a sectional view of my tool post and holder taken on the lines 1—1 of Fig. 2.

Fig. 2 is a sectional view of my tool post and holder, taken on the lines 2—2 of Fig. 1.

Fig. 3 is a sectional detail view of the handle engagement with the manipulating elements of the post, the section being taken substantially through the lines 3—3 of Fig. 2.

Fig. 4 is a perspective view of my tool post on the carriage of a lathe showing the tool holder ready for assembly.

Fig. 5 is a perspective detail view of my tool holder.

Fig. 6 is a perspective view of the assembled unit of my tool post and holder.

Fig. 7 is a cross sectional detail view of a modified handle and manipulating arrangement for my tool post and tool holder taken on the lines 7—7 of Fig. 8; and Fig. 8 is a fragmental sectional view of the modified handle and manipulating arrangement on the post.

In the illustrative embodiment of my invention a tool post 1 is formed generally in the shape of a cube. Along each corner of the tool post 1 is a vertical generally rectangular channel 2 extending in depth in generally diagonal direction with respect to the post 1.

A bolt 3 extends upwardly through a central hole 4 of the post 1. The head 6 on the lower end of the bolt 3 is of the usual type, preferably square, for slidably but not rotatably fitting into the T-shaped base channel 7 of the lathe slide 8.

The top of the hole 4 terminates in a countersunk circular recess 9. A cam cylinder 11 rotatably fits in the recess 9 and rests on the bottom of said recess 9. A clamping nut 12 rotatably fits into a bore 13 in the center of the cam cylinder 11 and is threaded on the bolt 3.

A hole 14 extends from the center of each face 16 of the tool post 1 inwardly generally radially with respect to the cam cylinder 11. The inner portion of each hole 14 is countersunk to accommodate therein the head 17 of a plunger 18 and a coil spring 19 around said plunger 18 normally urging the plunger head 17 inwardly against the adjacent cam periphery. The plunger 18 is slidable in the hole 14.

The cam cylinder 11 has an annular eccentric cam 21 around its periphery at about the level of said spring loaded plunger heads 17 so that the plunger heads 17 ride on the eccentric cam 21. The plungers 18 are respectively concealed in the hole 14 and project outwardly of the hole 14 according to the location of the protuberances and dents of the cam 21. Thus by suitably turning the cam cylinder 11, the respective spring loaded plungers 18 are pushed out or drawn in as desired. By suitably turning the clamping nut 12 the post 1 is tightly fastened in place or loosened for angular adjustment as desired.

A tool holder 22 is formed suitably to hold a particular type of tool 23. In this instance a horizontal bore 24 holds the shank of the tool 23. This tool holder 22 is split at 26 and the flanges 27 thus formed are squeezed together by suitable screw or bolts 28.

The tool holder 22 is mounted on the adjacent tool post face 16 by a vertical dovetail recess-like side 29 the vertical edges of which are formed into converging vertical retaining flanges 31 loosely fitting for endwise insertion into the respective corner channels 2.

In said side 29 of the tool holder 22 are four evenly spaced sockets 32 in which are held spring loaded aligning balls 33 projecting normally beyond the surface of said tool holder side 29. The pressure exerted by these spring loaded balls 33 against the tool post face 16 pulls the retaining flanges 31 against the nearer sides of the corner channels 2, and holds the tool holder 22 truly aligned on the post 1.

When the cam cylinder 11 is turned so as to push out the adjacent plunger 18 against the tool holder side 29, it clamps the retainer flanges 31 tightly against the sides of the corner channels 2 between the flanges 31 so as to fasten the tool holder 22 firmly in place.

For the necessary accurate height adjustment of the tool holder 22, there is provided a top bracket 34 held in place by a screw 36. In an ear 37 of this bracket 34 projecting above the top of the post 1 is a set screw 38 which bears against the top of the post 1 and determines the relative height of the tool holder 22 and properly centers the tool 23.

Rapid manipulation of the tool posts 1 and the tool holder 22 is accomplished by a single handle 41 and a selective engagement means between the handle 41 and the clamping nut head 42 and the cam head 43.

In the form shown in Figs. 2 and 3 each head 42 and 43 has on its periphery a plurality of teeth 44. A pair of opposite ratchet pawls 46 are pivoted in the handle 41 and are urged by springs 47 toward the opposite sides of the ratchet head 42. An actuating cam 48 between the pawls 46 normally holds both pawls 46 out of engagement with the teeth of the ratchet head 42. A trip or pivot lever 49 extends from the actuator cam 48 to the outside of the handle 41. As the pivot lever 49 is turned from its neutral position in one direction or in the other it causes the cam to release one of the pawls 46 for engagement with the ratchet head 42 so that the ratchet head 42 turns with the handle 41 in the respective direction for rapidly loosening or tightening the clamping nut 12 and the tool post 1.

Another pair of pawls 46 mounted and operated identically with the first described pair is disposed in the handle 41 below the first pair so as to align with the teeth of the cam ratchet head 43. The lower pivot lever 49 extends downwardly through the underside of the handle 41 for selective separate operation.

In operation the turning of the upper lever 49 causes suitable working engagement between the handle 41 and the clamp nut head 42, and the turning of the lower lever 49 causes suitable working engagement between the handle 41 and the cam head 43. Then by suitably turning the handle 41 the tool post 1 can be loosened and also the cam can be turned for allowing exchange, or adjustment of the tool holder 22, and for permitting angular adjustment of the tool post 1.

In the modified form shown in Figs. 7 and 8 a clamp nut head 52 and a cam head 53 are disposed in superimposed relation. Each head 52 and 53 has a series of circumferentially spaced holes 54. An operating hub 56 fits over both heads 52 and 53. A handle 57 slidably extends through a hole 58 in said hub 56 so that inner or plunger end of the handle is insertable in an aligned hole 54 of the lower cam head 53. A spring loaded plunger pin 59 is assembled in another hole 61 parallel with and in vertical alignment above the handle 57 so as to be insertable into a registering hole 54 in the upper or clamp nut head 52.

A boss 62 extends outwardly from the hub 56 in extension of each hub hole 58 and 61. The diameter of the inner end of the plunger portion of the pin extending through the hub hole 58 fits into the cam head holes 54. A stem portion adjacent said plunger end is smaller than the handle diameter and slidably fits through the hole of the boss 62. Portions of the handle 57 at the root of said reduced plunger stem are cut away to form diametrical, opposite abutment wings 63 which slidably fit into aligned substantially diametrical slots 64 in the outer end of the boss 62 at opposite sides of the hole through said boss 62. A coil spring 66 around said reduced stem bears against the inner plunger portion at one end thereof and against the inner end of the boss 62 at its other end so as to urge the handle inwardly toward the cam head periphery. When the handle 57 is pulled out and turned about its axis so as to turn the abutment wings 63 out of alignment with respect to said slots 64, then the wings 63 abut against the outer end of the boss 62 and hold the plunger end away from said cam head 53. When the turning of the cam is required the handle 57 is turned about its axis so as to align the abutment wings 63 with the wing slots 64 and then the hub 56 is turned until the plunger end of the handle 57 is in registry with one of the cam head holes 54, whereupon the said plunger end snaps into the registering hole 54 and the cam head is turned by and with the handles 57 and the hub 56 for the required cam adjustment. Thereafter the handle plunger can be disengaged from the cam head as heretofore described.

The structure and assembly and operation of the top plunger pin 59 is identical with the plunger end of the handle 57 heretofore described, except that the outer plunger end is shorter and provides only a knurled gripping end. The top plunger pin 59 cooperates with the clamp nut head similarly to the handle plunger's operation herein described.

The tool post and tool holder combination herein described permits the mounting of at least two tools simultaneously and allows quick turning and angular adjustment of the tool post for bringing either tool into cutting position. The device also permits rapid loosening and changing of tool holders and tools, and accurate and speedy alignment and centering. The device is eminently suitable for adapted usual lathe or the like for quantity production of work pieces where the tool-setting is a most important feature, because the herein device facilitates bringing the tools into rapid action and setting the tools in readiness for any sequence of operation. For squaring the tool post on the lathe carriage when designed, I provide a pair of aligning elements 71 held in place by screws 72 on a side 16 and near the bottom of the post 1 for abutment with the outside edge of the carriage. When not used the elements 71 can be held in the out of the way position indicated in broken lines in Fig. 4.

I claim:

1. In a tool post and tool holder combination adapted to be mounted by a substantially stationary tool-post-mounting on a machine feed carriage, a tool post rotatably adjustable about said stationary tool-post-mounting, an aligning face on the tool post, a channel formed along each vertical edge of said aligning face, said channels converging generally toward one another cross-sectionally of said tool post, a tool holder adapted to hold a tool; a side of said tool holder facing said aligning face, cross-sectionally converging spaced retaining flanges extended from said tool holder side and slidably fitting into said channels respectively; an actuating cam rotatably mounted in said tool post; plunger means reciprocably mounted in said tool post and extending substantially at right angles to and through said aligning face between said cam and said tool holder side so as to be movable by said cam against said tool holder side for forcing said tool holder away from said aligning face and forcing said converging flanges against the respective converging channels, said plunger means being substantially equally spaced between said channels to transmit substantially equal pressure to each of said flanges in the respective channels.

2. In a tool post and tool holder combination adapted to be mounted by a substantially stationary tool-post-mounting on a machine feed carriage, a tool post rotatably adjustable about said stationary tool-post-mounting, an aligning face on the tool post, a channel formed along each vertical edge of said aligning face, said channels converging generally toward one another cross-sectionally of said tool post, a tool holder adapted to hold a tool; a side of said tool holder facing said aligning face, cross-sectionally converging spaced retaining flanges extended from said tool holder side and slidably fitting into said channels respectively; an actuating cam rotatably mounted in said tool post; plunger means reciprocably mounted in said tool post and extending substantially at right angles to and through said aligning face between said cam and said tool holder side so as to be movable by said cam against said tool holder side for forcing said tool holder away from said aligning face and forcing said converging flanges against the respective converging channels, said plunger means being substantially equally spaced between said channels to transmit substantially equal pressure to each of said flanges in the respective channels, and a plurality of spring loaded aligning balls rotatably held between said faces for even spacing and alignment of said tool holder side with respect to said aligning face.

3. In a tool post and tool holder combination adapted to be mounted by a substantially stationary tool-post-mounting on a machine feed carriage, a tool post rotatably adjustable about said stationary tool-post-mounting, an aligning face on the tool post, a channel formed along each vertical edge of said aligning face, said channels converging generally toward one another cross-sectionally of said tool post, a tool holder adapted to hold a tool; a side of said tool holder facing said aligning face, cross-sectionally converging spaced retaining flanges extended from said tool holder side and slidably fitting into said channels respectively; an actuating cam rotatably mounted in said tool post; plunger means reciprocably mounted in said tool post and extending substantially at right angles to and through said aligning face between said cam and said tool holder side so as to be movable by said cam against said tool holder side for forcing said tool holder away from said aligning face and forcing said converging flanges against the respective converging channels, said plunger means being substantially equally spaced between said channels to transmit substantially equal pressure to each of said flanges in the respective channels, and handle means to rotate said cam for selectively applying outward pressure on said plunger means or releasing said pressure and permitting movement of said plunger means inwardly of said tool post.

4. In a tool post and tool holder combination adapted to be mounted by a substantially stationary tool-post-mounting on a machine feed carriage, a tool post rotatably adjustable about said stationary tool-post-mounting, an aligning face on the tool post, a channel formed along each vertical edge of said aligning face, said channels converging generally toward one another cross-sectionally of said tool post, a tool holder adapted to hold a tool; a side of said tool holder facing said aligning face, cross-sectionally converging spaced retaining flanges extended from said tool holder side and slidably fitting into said channels respectively; an actuating cam rotatably mounted in said tool post; plunger means reciprocably mounted in said tool post and extending substantially at right angles to and through said aligning face between said cam and said tool holder side so as to be movable by said cam against said tool holder side for forcing said tool holder away from said aligning face and forcing said converging flanges against the respective converging channels, said plunger means being substantially equally spaced between said channels to transmit substantially equal pressure to each of said flanges in the respective channels, said tool-post-mounting including a pivot bolt, a clamping head on said pivot bolt for tightening or loosening said tool post on said pivot bolt; a head on said cam being generally coaxial with said clamping head, a handle fitting over both heads simultaneously, and releasable engagement means on said handle selectively engageable for turning either of said heads.

5. In a tool post and tool holder combination adapted to be mounted by a substantially stationary tool-post-mounting on a machine feed carriage, a tool post rotatably adjustable about said stationary tool-post-mounting, an aligning face on the tool post, a channel formed along each vertical edge of said aligning face, said channels converging generally toward one another cross-sectionally of said tool post, a tool holder adapted to hold a tool; a side of said tool holder facing said aligning face, cross-sectionally converging spaced retaining flanges extended from said tool holder side and slidably fitting into said channels respectively; an actuating cam rotatably mounted in said tool post; plunger means reciprocably mounted in said tool post and extending substantially at right angles to and through said aligning face between said cam and said tool holder side so as to be movable by said cam against said tool holder side for forcing said tool holder away from said aligning face and forcing said converging flanges against the respective converging channels, said plunger means being substantially equally spaced between said channels to transmit substantially equal pressure to each of said flanges in the respective channels, said tool post being of polygonal cross section, and having an aligning face on each side thereof, and having cross-sectionally converging channels at each vertical corner thereof for selective coaction with the respective converging flanges on said tool holder side.

References Cited in the file of this patent

UNITED STATES PATENTS

| | | |
|---|---|---|
| 416,154 | Cosette | Dec. 3, 1889 |
| 2,403,405 | Sirola | July 2, 1946 |

FOREIGN PATENTS

| | | |
|---|---|---|
| 338,658 | Italy | Mar. 31, 1936 |
| 400,530 | Great Britain | Oct. 26, 1933 |
| 559,290 | Germany | Sept. 17, 1932 |
| 623,726 | Great Britain | May 23, 1949 |